United States Patent
Berg

(10) Patent No.: US 6,561,552 B1
(45) Date of Patent: May 13, 2003

(54) PIPE JOINT AND A METHOD FOR ITS MANUFACTURING

(76) Inventor: Lennart Berg, Ullångergatan 5, S - 162 54 Vallingby (SE)

(*) Notice: Subject to any disclaimer, the term of this patent is extended or adjusted under 35 U.S.C. 154(b) by 0 days.

(21) Appl. No.: 09/937,548

(22) PCT Filed: Mar. 6, 2000

(86) PCT No.: PCT/SE00/00441
§ 371 (c)(1),
(2), (4) Date: Sep. 26, 2001

(87) PCT Pub. No.: WO00/58657
PCT Pub. Date: Oct. 5, 2000

(30) Foreign Application Priority Data

Mar. 30, 1999 (SE) .............................................. 9901163

(51) Int. Cl.$^7$ .............................................. F16L 27/00
(52) U.S. Cl. ..................... 285/371; 285/367; 285/408
(58) Field of Search ........................ 285/371, 363, 285/364, 365, 366, 367, 408, 423

(56) References Cited

U.S. PATENT DOCUMENTS

| | | | | |
|---|---|---|---|---|
| 546,314 A | * | 9/1895 | Farrey | 285/334.2 |
| 740,664 A | * | 10/1903 | Kroll | 285/111 |
| 2,068,648 A | * | 1/1937 | Kaplin | 285/133.21 |
| 2,287,142 A | * | 6/1942 | Simmonds | 285/334.3 |
| 2,837,353 A | * | 6/1958 | Ashbrook | 277/622 |
| 3,241,867 A | * | 3/1966 | Guarnaschelli | 285/109 |
| 3,253,841 A | * | 5/1966 | Ahmad | 277/608 |
| 3,472,533 A | * | 10/1969 | Turner | 285/258 |
| 3,851,902 A | * | 12/1974 | Robinson | 285/334.2 |
| 4,354,698 A | * | 10/1982 | Linder et al. | 285/272 |
| 4,621,838 A | * | 11/1986 | Kneidel et al. | 166/242.1 |
| 5,692,785 A | * | 12/1997 | Wartluft et al. | 285/105 |

FOREIGN PATENT DOCUMENTS

| | | | |
|---|---|---|---|
| DE | 914803 | * | 7/1954 |
| DE | 9113612 | * | 2/1992 |
| NO | 119297 | * | 4/1970 |
| SE | 332551 | * | 2/1971 |
| WO | 95/06221 | * | 3/1995 |

* cited by examiner

Primary Examiner—Eric K. Nicholson
(74) Attorney, Agent, or Firm—Ostrolenk, Faber, Gerb & Soffen, LLP

(57) ABSTRACT

The invention concerns a pipe connection for preferably polyethylene-pipes for high media pressure and a method of manufacturing said connection where said pipe-connection (1) shows connecting parts (4, 5; 4', 5) with an inside dimension larger than the inside diameter of the pipe, in order to receive at least one in the connecting parts (4, 5; 4', 5) insertable connecting component (6, 7), and an exterior casing (8) for pulling together and retaining the connecting parts. The connecting component (6, 7) comprises on first hand at least one, in respective connecting part applied metal-sleeve (13, 14) with radial inwards acting sealing components (15, 16), and on second hand one, through the two metal-sleeves extending joining-pipe (17) with an outside dimension allowing the joining-pipe (17) to be in contact with the sealing components (15, 16) of the metal-sleeves, and an inside diameter mainly corresponding to the inside diameter of the connected pipes (2, 3; 24, 3).

6 Claims, 2 Drawing Sheets

PIPE JOINT AND A METHOD FOR ITS MANUFACTURING

The present minion relates to a pipe-connection and a method of manufacturing said pipe-connection, said connection being intended especially for polyethylene-pipes for high media pressure and showing connecting parts with a diameter greater than the diameter of the pipe in order to engage at least one, in the connecting parts insertable joining component, and an exterior casing for pulling together and retaining the connected parts.

Plastic pipes and especially polyethylene-pipes intended for high media-pressure are today mostly connected by means of an electric butt-welding method. Also other methods are used where the pipe-parts which are to be connected are sealed and retained by applying a sealing ring and a clamping sleeve against the outer surfaces of the pipes.

However, the surface roughness of the outer surface of said polyethylene-pipes is bad, which causes leakage at high pressure. As a result these types of connections for pipes are only approved for transportation of water. But if you warn to achieve a perfectly safe sealing when connecting these plastic-pipes, using the electric butt-welding method is at present the only solution.

PVC (poly chloride)-pipes for high pressure are nowadays connected by cementing. These pipes can not be welded by the electric method. On the other hand, polyethylene-pipes can not be cemented but must be electric-welded Consequently, the electric butt- welding method requires access to electric current, which in itself is not very flexible, because you mostly have to apply the welding equipment on the very spot where the pipes are to be connected Furthermore, this method is rather time consuming.

The purpose of the present invention is to remove the drawbacks described above and to produce a pipe-connection of the kind mentioned in the introduction and a method of connecting plastic pipes by means of the same.

The characteristics of the invention are pointed out in the patent claims following later.

Thanks to the invention a pipe-connection has been accomplished, which in an extraordinary way fulfills is purposes and where at the same time the procedure of connecting by means of this pipe-connection is fast and cheap to accomplish, and also the cost of production for the connection itself according to the invention can be kept low. By the procedure of using this pipe-connection especially for polyethylene-pipes a completely safe sealing also for high media pressure is achieved, without the need of any electric equipment.

Figure 1:
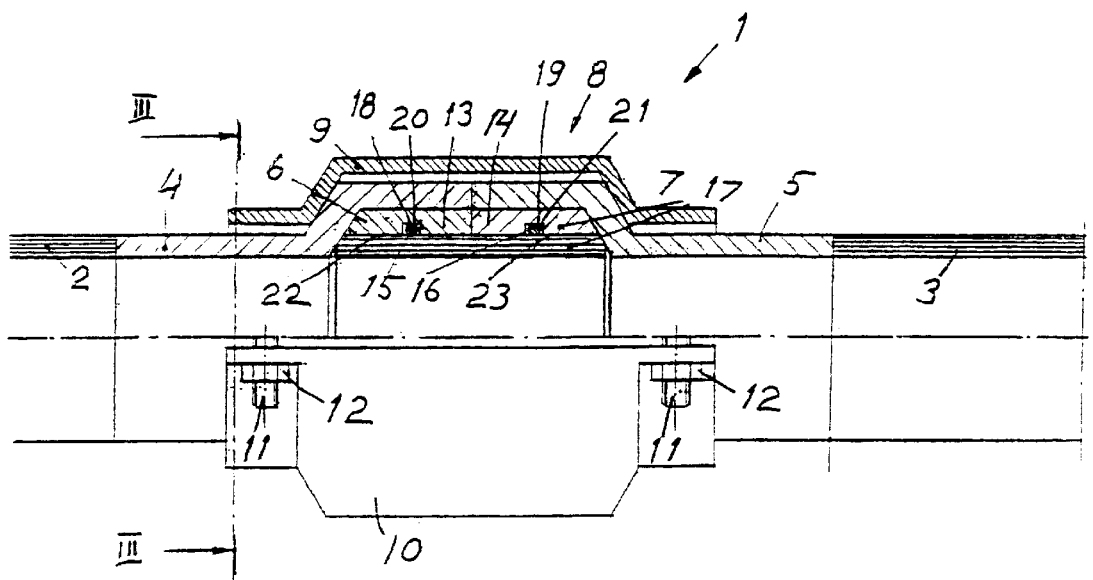
Figure 2:
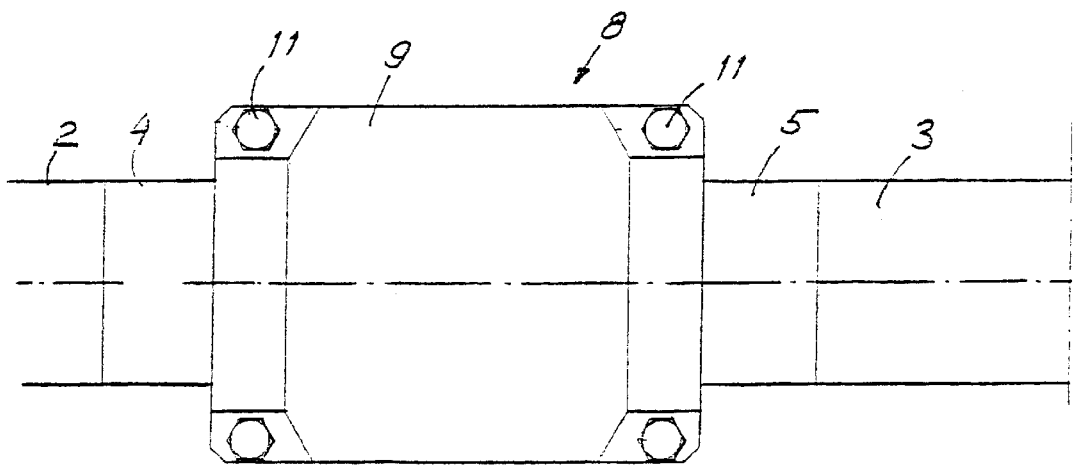
Figure 3:
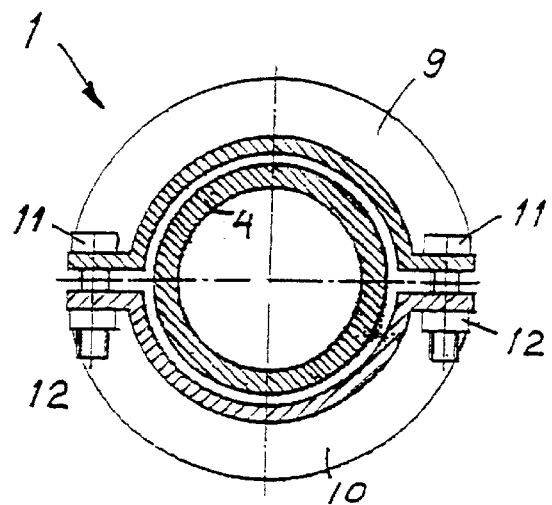
Figure 4:
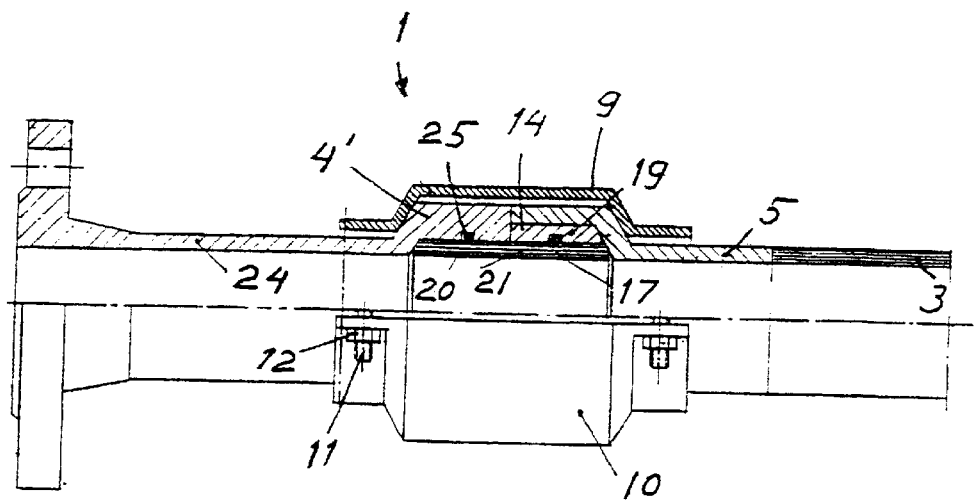

The invention is described more in detail below, by means of a shown example, referring to the enclosed drawing, on which FIG. 1 shows a schematic cross section of a connection between two plastic pipes according to the present invention FIG. 2 shows a view from above of the connection shown in FIG. 1, FIG. 3 shows a cross section through the connection along the line III:III in FIG. 1 and FIG. 4 shows a schematic cross section of an alternate design of a connection according to the present invention.

As can be seen in the drawing the invention consists in the shown example of a pipe-connection 1 between polyethylene-pipes 2, 3, intended for high media pressure. The pipe-connection 1 presets connecting parts 4, 5 with a diameter in its free, opposite ends, which is larger than the diameter of the pipes 2, 3, for the purpose to receive at least one in the connected parts 4, 5 insertable joining component 6, 7, and preferably conical engaging surfaces for casing halves 9, 10 belonging to an exterior casing 8, retaining the pipe-connection 1. The halves 9, 10 form the exterior casing 8 and can be clamped together by means of bolts 11 and nuts 12. In an alternate design the connecting parts 4, 5 may have a conical form in the free, opposite ends, in which case the joining component 6, 7 have outer dimensions smaller than those of the connecting parts 4, 5.

The joining component 6, 7 consists partly of at least one connecting part 4, 5 respectively applied, reinforcing metal-sleeve 13, 14 with sealing components 15, 16, acting inwards direction, and partly a joining-pipe 17, extending though the two metal-sleeves 13, 14, having an outside diameter corresponding to the inside diameter of the metal-sleeves and a length allowing the joining-pipe 17 to extend into sealing contact with the sealing components 15, 16 of the metal-sleeves 13, 14, where at the same time the inside diameter of the joining-pipe 17 mainly corresponds to the inside diameter of the connected pipes 2, 3. The metal-sleeves 13, 14 have a reinforcing influence to avoid deformation of the plastic material, a deformation which may cause leakage in the connection, especially at high pressure.

The sealing components 15, 16 of the metal sleeves 13, 14 comprise O-rings 20, 21, being positioned in machined grooves 18, 19 in the inside mantle-surface 22,23 of the metal-sleeves 13, 14 respectively. The joining-pipe 17 is of a length mainly corresponding to the added length of the two metal-sleeves 13,14.

In order to connect prefabricated pipes of standard length to each other, the polyethylene-pipes are in the factory in each end equipped with connecting parts 4, 5, which are also made of polyethylene.

At first the metal-sleeves 13, 14 are shrinked or pressed into sealing fit with the connecting parts 4, 5. Thereafter, the connecting parts 4, 5 are butt -welded in the factory to the polyethylene pipes and these are delivered in this state together with joining-pipes 17, O-rings 20, 21, exterior casing 8 and bolts 11 and nuts 12 for the casing.

On the site of installation the installer positions the two O-rings 20, 21 in their grooves 18, 19 in the metal-sleeves 13, 14, whereafter the joining-pipe 17 is inserted in the pipe-ends which are to be connected Then the casing-halves 9, 10 are applied outside the connecting parts 4, 5 and these parts are pulled together, using the bolts 11 and nuts 12, thus completing the connection.

For alternate designs the connection 1 according to the invention can be varied in many and also be used for other materials than polyethylene. For instance, for the alternate design shown in FIG. 4 one of the connecting parts 24 is made of metal, for instance steel, and is formed with a connection, where these parts are made in one piece. The groove 25 for the O-ring is machined in that section of the connecting part 4 which corresponds to the sleeve 13 above. This design allows a simple connection of the metal-pipe 24 to polyethylene-pipe 3 by inserting a joining-pipe 17 into the two connecting-parts 4, 5, in the same way as described above.

What is claimed is:

1. A pipe connection for polyethylene-pipes for high mediation pressure and the pipes have connecting parts of continuous cylindrical or conical shape where a portion of a casing of the pipe connection has an inside dimension larger than the pipe-diameter and receives at least one connecting part comprising a casing with two halves that can be pressed together,
at least one connecting component, each connecting component engages a respective connecting part, an applied reinforcing metal-sleeve with sealing components acting radially inwards, and one connecting part through the metal-sleeve extending a joining-pipe wherein the connecting part has an outside diameter which allows the joining-pipe to be in contact with the sealing components of the metal-sleeves and with an inside diameter corresponding to the inside diameter of the connected pipe whereby when the halves are pulled together the casing retains and positions the connecting parts of the pipes to complete the pipe-connection.

2. The pipe connection according to claim 1, wherein the sealing components of the metal-sleeves comprise O-rings applied in grooves on the inside surface of said metal-sleeves.

3. The pipe connection according to claim 1, wherein the length of the joining-pipe corresponds to an added length of the metal-sleeves.

4. A method of manufacturing a pipe-connection for polyethylene-pipes intended for high media pressure and where each end of said pipes has connecting parts with each outer end having a larger inside dimension than the pipes comprising:

pressing, during a first stages a metal-sleeve firmly into a free end part of at least one of the connecting parts and at least one connecting part is welded to the end of the pipe, and applying, during a second stage at a final connection of the pipes, O-rings in grooves in an inside mantle-surface of each respective metal-sleeve, whereupon a joining-pipe with a length exceeding the length of the respective metal-sleeve is inserted in the pipe-ends, and arranging two halves of an exterior casing to enclose the connecting parts such that when the halves are pulled together the casing retains and positions the connecting parts of the pipes to complete the pipe-connection.

5. The pipe connection according to claim 1, wherein the connecting component and the connecting parts of the pipes have complimentary conical surfaces that engage one another when the two halves are pulled together.

6. The method according to claim 4, wherein the arranging of the two halves of the pipe connection engage complimentary conical surfaces of the connecting component and the connecting parts of the pipes when the two halves are pulled together.

* * * * *